July 13, 1965

D. J. ADRIAN 3,195,130

AM RADAR WITH NOISE CORRELATION

Filed Feb. 23, 1961

DONALD J. ADRIAN
INVENTOR.

BY F. M. Phillips
J. M. St. Amand
ATTORNEYS

United States Patent Office 3,195,130
Patented July 13, 1965

3,195,130
AM RADAR WITH NOISE CORRELATION
Donald J. Adrian, Corona, Calif., assignor to the United States of America as represented by the Secretary of the Navy
Filed Feb. 23, 1961, Ser. No. 91,286
3 Claims. (Cl. 343—12)
(Granted under Title 35, U.S. Code (1952), sec. 266)

The invention herein described may be manufactured and used by or for the Government of the United States of America for governmental purposes without the payment of any royalties thereon or therefor.

The present invention relates to radar systems and more particularly to an amplitude modulated radar using noise correlation.

In known radar systems which utilize noise autocorrelation recovery of the noise signal is poor and they have a lack of target discrimination, for example, British Patent No. 724,555; February 23, 1955, recovery of the noise is complicated in that a series of frequency transposition are necessary and the system has no moving target discrimination.

Accordingly, an object of the present invention is the provision of an amplitude modulated radar using noise correlation which overcomes the disadvantages of prior known systems.

Another object is to provide a simple noise correlation radar having improved counter-countermeasure characteristics.

A further object of the invention is the provision of a simple noise correlation radar system which has improved chaff and sea return discrimination.

Still another object is to provide a noise correlation radar system which has the ability to distinguish a moving target in the presence of chaff and sea return.

Other objects and many of the attendant advantages of this invention will become readily appreciated as the same becomes better understood by reference to the following detailed description when considered in connection with the accompanying drawings wherein.

Figure 1:
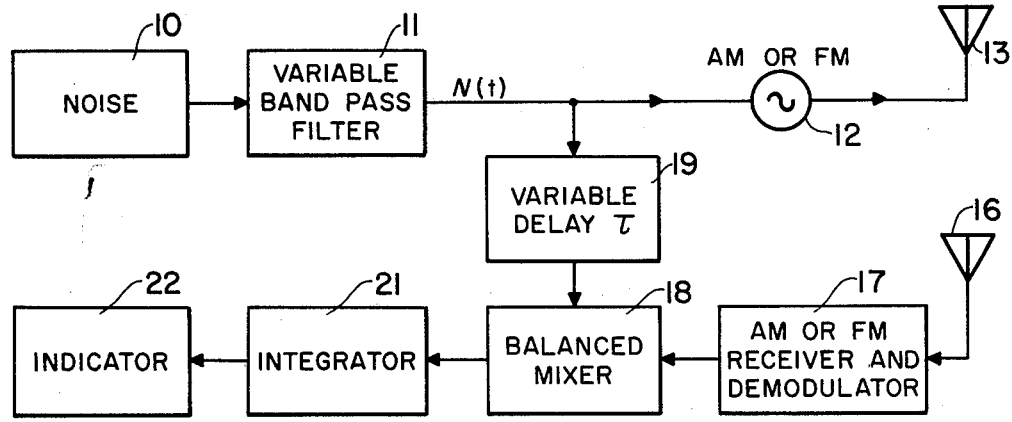
FIGURE 1 shows a block diagram of a simple type noise correlated radar.

Referring now to FIGURE 1, there is shown a noise source 10 coupled through a variable band pass filter 11 for amplitude or frequency modulating the oscillator 12 to produce a noise modulated carrier at transmitting antenna 13. The transmitted signal is reflected from a target (not shown) and received by antenna 16 which is coupled to an AM or FM receiver and demodulator 17. The output of receiver and demodulator 17 is mixed in balanced mixer 18 with a noise signal coupled through a variable delay circuit 19 from noise source 10. The output of mixer 18 is integrated in integrator 21 and displayed on indicator 22. A maximum output signal will appear on indicator 22 when delay, $\tau$, equals the space delay to a target and back, $2d/c$.

Figure 2:
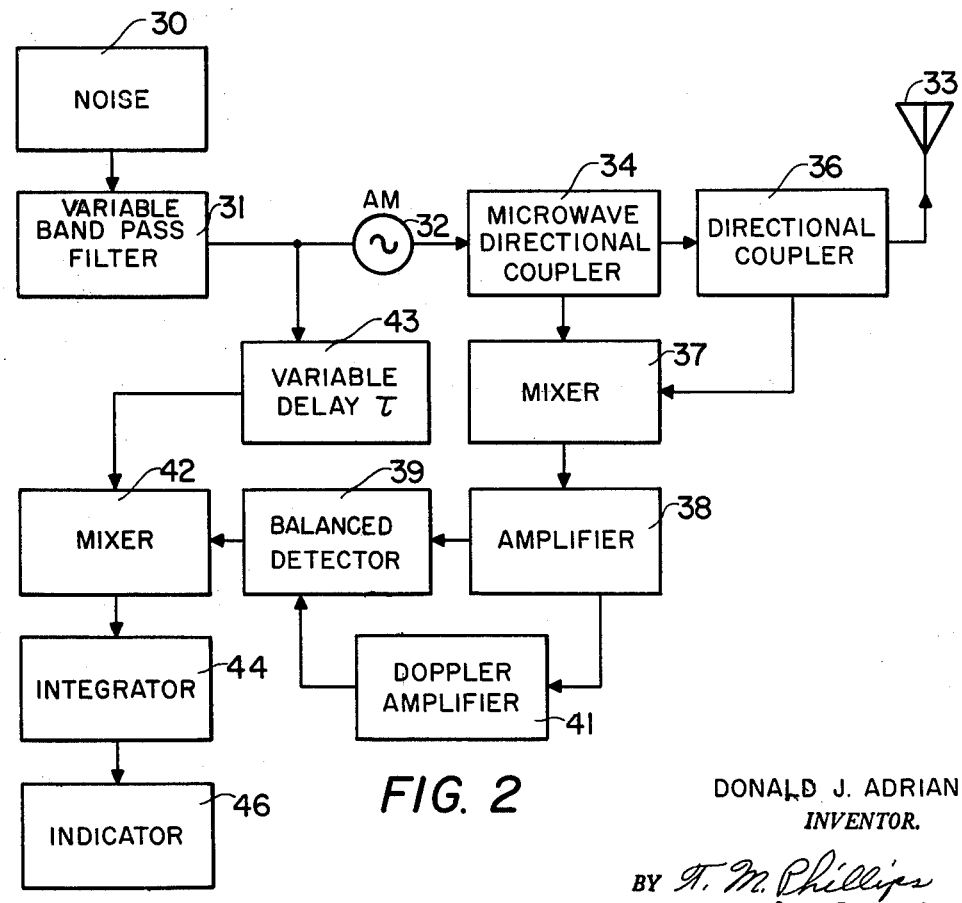
FIGURE 2 shows a block diagram of a noise correlated radar embodying the invention.

Referring now to FIGURE 2, there is shown a noise source 30 coupled through a variable band pass filter 31 for amplitude modulating oscillator 32 to produce a noise modulated signal at transmitting and receiving antenna 33. Antenna 33 is coupled to oscillator 32 through directional couplers 34 and 36 and to mixer 37 through directional coupler 36. The output signal of oscillator 32 is also coupled as an input to mixer 37. The output signal of mixer 37 is amplified in amplifier 38 and detected in the balanced detector 39 while a part of the amplified signal is further amplified in Doppler amplifier 41 and coupled as a second input to detector 39. The output signal of detector 39 is mixed in mixer 42 with the noise signal from noise source 30 which is coupled through a variable delay circuit 43. The output signal of mixer 42 is integrated in integrator 44 and displayed on indicator 46.

Figure 3:
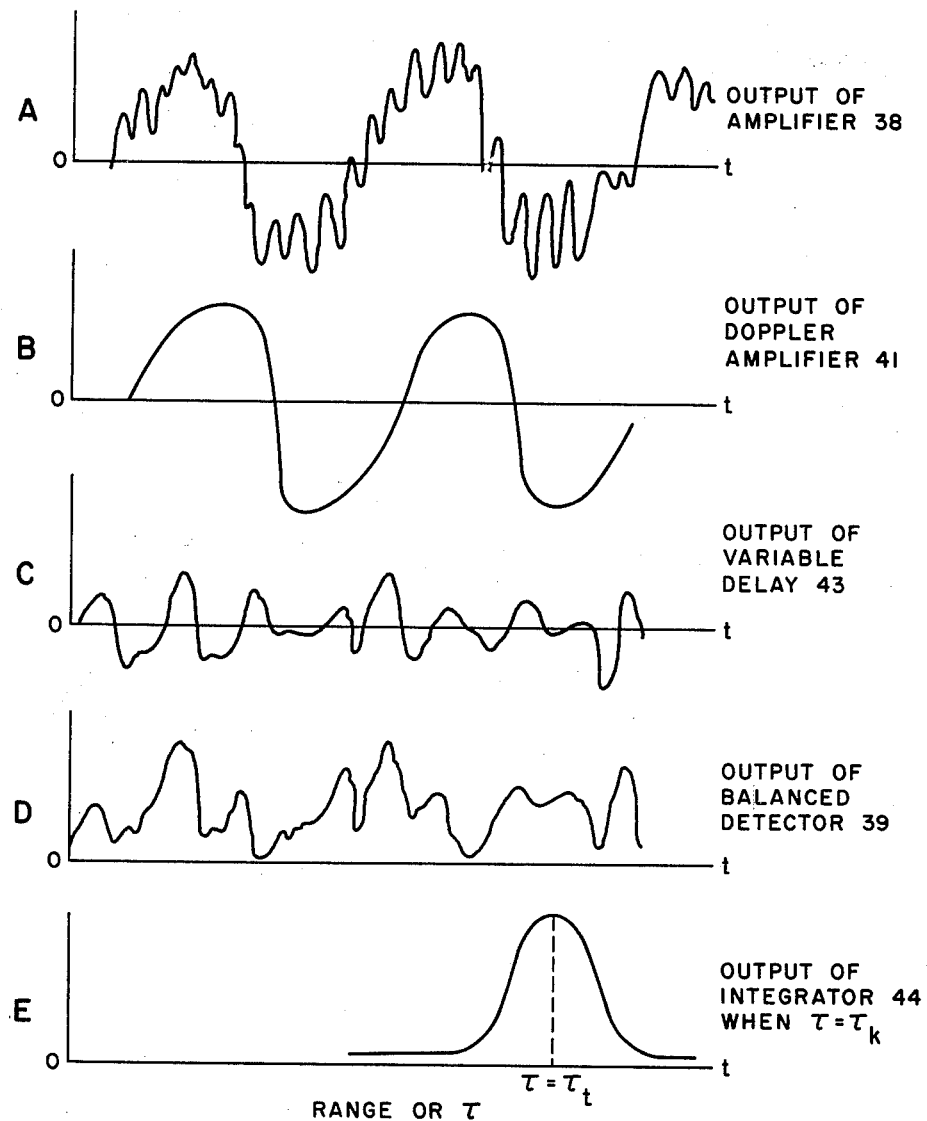

Referring to FIG. 3 there is shown representative output waveforms for amplifiers 38 and 41, detector 39 and integrator 44. The same signal is fed from amplifier 38 to Doppler amplifier 41 and to balanced detector 39 and has an output signal as shown by waveform A in FIG. 3. Doppler amplifier 41 is tuned to pass the Doppler frequency and has an output signal as shown by waveform B in FIG. 3. The delayed noise signal (waveform C) along with the output from balanced detector (waveform D) are combined in mixer 42. Waveform E shows the output of integrator 44 when the delay of variable delay 43 ($\tau$) is equal to the delay of the reflected signal ($\tau_t$).

The operation of the system of FIGURE 2 can best be understood when considered with the following:

The amplitude modulated transmitted signal is:

$$V_T = Vo[1+N(t)] \cos \omega_0 t \qquad (1)$$

where $Vo$ = carrier signal
$N(t)$ = modulating signal
$\omega_0$ = carrier frequency The return from a reflector or target is given by $$V_R = kVo[1+N(t-\tau_t)] \cos \omega_0(t-\tau_t) \qquad (2)$$

where $\tau_t$ = twice the target range divided by the velocity of light.

The output of mixer 37 is then $$V_m = kVo[1+N(t-\tau_t)] \cos \omega_d t \qquad (3)$$

where $\omega_d$ = Doppler frequency.

The portion of signal (3), $\cos \omega_d t$, is further amplified in amplifier 41 and then mixed with signal (3) in detector 39 which may be a product mixer or coherent detector. Doppler amplifier 41 may be a band pass amplifier of the type shown in Figure 114 of Radar Electronic Fundamentals, NAVSHIPS 900,016, U.S. Government Printing Office, June 1944. The band pass should be chosen to select the range of Doppler frequency expected (the Doppler frequency is $2v/\lambda$, where $v$ is the relative velocity and $\lambda$ is the wavelength of the transmitted wave). Balanced detector 39 may be of the ring bridge modulator type shown in Fig. 11, p. 788, Institute of Radio Engineers Proceedings, May 1959. The output of detector 39 is the sum and difference of the two input signals. The noise portion, $[1+N(t-\tau_t)]$, of the signal remains unchanged while the sum of the signal frequency is $\cos(\omega_d t - \omega_d t)$ and the difference is $\cos(\omega_d t - \omega_d t)$.

$$\cos(\omega_d t + \omega_d t) = \cos 2\omega_d t$$

and $$\cos(\omega_d t - \omega_d t) = \cos 0 = 1$$

The output of detector 39 then is of the form $$V_d = k[1+N(t-\tau_t)][1+\cos 2\omega_d t] \qquad (4)$$

The signal (4) is correlated with the signal out of delay circuit 43, $N(t-\tau)$, giving the product of $N(t-\tau)$ and Equation 4.

$$\overline{KN(t-\tau)N(t-\tau_t)} + \overline{KN(t-\tau)} \\ + \overline{KN(t-\tau)[1+N(t-\tau_t)] \cos 2\omega_d t} \qquad (5)$$

where the bar represents the time average. The first term of Equation 5 is the desired signal, the second term is zero and the third term is zero when the integration time is longer than the period of the Doppler since the product goes alternately positive and negative. Thus, sea and chaff return (clutter) due to their lack of a high Doppler frequency will be cancelled for the same reasons that the third term in Equation 5 is removed.

Variable band pass filter 31 and variable delay 43 may be of the continuous variable type or of the step type.

By using a noise modulated illuminator and performing the variable delay and correlation within the missile, this system provides a semi-active range gate in a guidance system.

Obviously many modifications and variations of the present invention are possible in the light of the above teachings. It is therefore to be understood that within the scope of the appended claims the invention may be practiced otherwise than as specifically described.

What is claimed is:

1. In a radar system the combination comprising: noise modulated transmitter means for generating and transmitting a radio frequency noise signal; receiver means including a first mixer circuit for recovering said noise signal which includes a Doppler frequency band, amplifier means coupled to said receiver means for amplifying only the Doppler frequency portion of said received signal, balanced detector means coupled to said Doppler amplifier means and to said receiving means for detecting a combined signal consisting of said amplified Doppler signal and said received signal, second mixer means for mixing said detected signal with a noise signal from said transmitter means for generating output pulses which represent the target from which said transmitted signal has been reflected.

2. In a radar system the combination comprising: noise amplitude modulated transmitter means for generating and transmitting a radio frequency noise signal; receiver means including a first mixer circuit for recovering said noise signal which includes a Doppler frequency band, amplifier means coupled to said first mixer for amplifying only the Doppler frequency portion of said received signal, balanced detector means coupled to said amplifier means and to said first mixer for detecting a combined signal consisting of said amplified Doppler signal and said received signal, second mixer means coupled to said balanced detector for mixing said detected signal with a delayed noise signal from said transmitter means for generating output pulses which represent the target from which said transmitted signal has been reflected.

3. In a radar system the combination comprising: an oscillator having an input and output; a noise source coupled through a variable band pass filter to the input of said oscillator to provide a modulating signal thereto; a first directional coupler having an input coupled to the output of said oscillator and a first and second output; a second directional coupler having a first input coupled to the first output of said first directional coupler, an output and an input-output coupled to a receiving and transmitting antenna; a first mixer having a first input coupled to the output of said second directional coupler, a second input coupled to the second output of said first directional coupler and an output; a Doppler amplifier having an input coupled to the output of said first mixer and having an output; a balanced detector having a first input coupled to the output of said first mixer, a second input coupled to the output of said Doppler amplifier and having an output; a second mixer having a first input coupled to the output of said balanced detector, a second input and an output; a variable delay circuit having an input coupled to said noise source and an output coupled to the second input of said second mixer; and indicator means coupled to the output of said second mixer.

References Cited by the Examiner

UNITED STATES PATENTS 2,522,367   9/50   Guanella _____ 343—17.2
2,841,783   7/58   Jamieson et al. _____ 343—17.1

CHESTER L. JUSTUS, *Primary Examiner.*

KATHLEEN H. CLAFFY, *Examiner.*